United States Patent
Vital Huici

(10) Patent No.: US 10,828,991 B2
(45) Date of Patent: Nov. 10, 2020

(54) ELECTRIC BICYCLES ANCHORING SYSTEM

(71) Applicant: RIDE ON CONSULTING, S.L., Pamplona (ES)

(72) Inventor: Miguel Vital Huici, Pamplona (ES)

(73) Assignee: RIDE ON CONSULTING, S.L., Pamplona (ES)

( * ) Notice: Subject to any disclaimer, the term of this patent is extended or adjusted under 35 U.S.C. 154(b) by 5 days.

(21) Appl. No.: 15/746,270

(22) PCT Filed: Apr. 19, 2016

(86) PCT No.: PCT/ES2016/070277
§ 371 (c)(1),
(2) Date: Jan. 19, 2018

(87) PCT Pub. No.: WO2017/013284
PCT Pub. Date: Jan. 26, 2017

(65) Prior Publication Data
US 2018/0208071 A1    Jul. 26, 2018

(30) Foreign Application Priority Data
Jul. 21, 2015  (ES) .................................. 201531071

(51) Int. Cl.
*B62H 5/20* (2006.01)
*B60L 11/18* (2006.01)
(Continued)

(52) U.S. Cl.
CPC ........... *B60L 11/1825* (2013.01); *B60L 53/31* (2019.02); *B62H 3/00* (2013.01); *B62H 3/10* (2013.01);
(Continued)

(58) Field of Classification Search
CPC .. B60L 11/1825; B60L 53/31; B60L 2200/12; B62H 3/00; B62H 3/10;
(Continued)

(56) References Cited

U.S. PATENT DOCUMENTS 2,947,830 A * 8/1960 Goss ...................... H01H 35/02
200/61.51
3,772,645 A * 11/1973 Odenz .................... B62H 5/003
340/571
(Continued)

FOREIGN PATENT DOCUMENTS

DE  102010044138 A1   5/2012
EP     0122842 A1   10/1984
(Continued)

*Primary Examiner* — Edwin A. Leon
*Assistant Examiner* — Milagros Jeancharles
(74) *Attorney, Agent, or Firm* — Hayes Soloway PC

(57) ABSTRACT

Electric bicycles anchoring system of the type comprising a first module (1) intended to be installed on the base (3) of an anchoring and recharge station for electric bicycles and a second module (2), complementary to the first module (1) and intended to be installed on an electric bicycle. It allows anchoring and battery recharge of the electric bicycle and triggering an alarm when it detects attempted robbery of the bicycle. It comprises electrical charge connections, data transmission elements in the two modules which make contact with each other when the bicycle is anchored to the station base.

8 Claims, 4 Drawing Sheets

(51) Int. Cl.
  B62M 6/80      (2010.01)
  G07F 17/00     (2006.01)
  H01R 13/627    (2006.01)
  B62H 3/10      (2006.01)
  B60L 53/31     (2019.01)
  B62H 3/00      (2006.01)
  H01R 13/62     (2006.01)
  H01R 13/70     (2006.01)

(52) U.S. Cl.
  CPC ............... B62H 5/20 (2013.01); B62M 6/80 (2013.01); G07F 17/0057 (2013.01); H01R 13/6205 (2013.01); H01R 13/6276 (2013.01); H01R 13/6277 (2013.01); H01R 13/70 (2013.01); B60L 2200/12 (2013.01); B62H 2003/005 (2013.01); H01R 2201/26 (2013.01)

(58) Field of Classification Search
  CPC ...... B62H 5/20; B62H 2003/005; B62H 3/02; B62M 6/80; B62M 6/40; G07F 17/0057; H01R 13/6205; H01R 13/6276; H01R 13/6277; H01R 13/70; H01R 2201/26; B62B 15/005; B60R 25/1001; E05B 45/00; E05B 2045/0695; E05B 2045/064; E05B 2045/065
  See application file for complete search history.

(56) References Cited

U.S. PATENT DOCUMENTS

| | | | | |
|---|---|---|---|---|
| 3,828,310 A | * | 8/1974 | Miller | B62H 5/20 340/427 |
| 4,669,791 A | * | 6/1987 | Savill | B60T 17/04 439/132 |
| 5,760,681 A | * | 6/1998 | Varis | B62H 5/20 200/61.64 |
| 6,059,536 A | | 5/2000 | Stingl | |
| 8,432,270 B2 | * | 4/2013 | Lee | B62J 99/00 340/426.19 |
| 8,949,022 B1 | * | 2/2015 | Fahrner | G01C 21/00 340/995.19 |
| 9,514,588 B2 | * | 12/2016 | Neupert | B62M 6/40 |
| 2004/0166725 A1 | | 8/2004 | Simmel | |
| 2008/0100426 A1 | * | 5/2008 | Kalous | B60R 9/06 340/426.22 |
| 2009/0266673 A1 | * | 10/2009 | Dallaire | B62H 3/02 194/205 |
| 2010/0228405 A1 | * | 9/2010 | Morgal | B62H 3/02 701/2 |
| 2010/0245128 A1 | * | 9/2010 | Kanof | B62H 3/00 340/932.2 |
| 2012/0071017 A1 | | 3/2012 | Gaul et al. | |
| 2012/0133326 A1 | | 5/2012 | Ichikawa et al. | |
| 2013/0052855 A1 | * | 2/2013 | Komatsubara | H01R 13/6276 439/348 |
| 2013/0089999 A1 | | 4/2013 | Martin | |
| 2013/0216885 A1 | * | 8/2013 | Kawatani | H01M 2/1083 429/100 |
| 2014/0016902 A1 | | 1/2014 | Pepe et al. | |
| 2015/0152668 A1 | * | 6/2015 | Assenat | B62H 3/02 70/277 |
| 2015/0204112 A1 | * | 7/2015 | Salzmann | B62H 5/003 70/15 |

FOREIGN PATENT DOCUMENTS

| | | | | |
|---|---|---|---|---|
| EP | 2955092 A1 | * | 12/2015 | ............ B62M 6/80 |
| EP | 3115252 A1 | * | 1/2017 | ............ H01R 24/68 |
| ES | 2319030 A1 | | 5/2009 | |
| ES | 2472445 A1 | * | 7/2014 | ............ B62M 6/80 |
| ES | 2472445 A1 | | 7/2014 | |
| FR | 2956375 A1 | | 8/2011 | |
| JP | 2003061253 A | * | 2/2003 | ............ B62M 6/40 |
| KR | 20110068816 A | | 6/2011 | |
| WO | 2006002165 A2 | | 1/2006 | |
| WO | 2010043635 A1 | | 4/2010 | |

* cited by examiner

ELECTRIC BICYCLES ANCHORING SYSTEM

OBJECT OF THE INVENTION

The present invention falls within the technical field of electric bicycles. More specifically an electric bicycles anchoring and recharge system is described.

BACKGROUND OF THE INVENTION

Electric bicycles of bike rental companies are configured so that the battery recharge is performed in stations comprising a plurality of anchoring bases. When bicycles are anchored at these stations, the batteries are recharged and data, such as the travel departure station, the user, bike number plate, date, time, etc., are transferred from the bicycle to a computer system controlled by the installation.

The anchoring system between the bicycle and the station is essential to ensure a secure attachment of the bicycle, a correct recharge of its battery and secure transmission of data between the station and the bike.

The state of the art discloses various types of anchoring systems currently being used in cities where there are electric bicycle rental services. Generally, to use these services, the user approaches the bicycle anchoring station, presents an identification to release a bicycle from a parking base and runs a route to another station where he or she again anchors the bike.

For example, document ES2319030 discloses a mechanical anchoring and electrical drive system wherein anchorage is performed directly to a side bolt coupled to the bicycle frame.

Electromagnetic type anchors are also known, as disclosed in WO200602165 wherein the magnetic field is produced by the current. A magnetic force is produced when electricity is applied and this magnetic force disappears by interrupting the power supply. Another type of electromagnetic anchor has a permanent magnetic field which is eliminated by applying an electric current to release the bicycle.

Other known systems combine an electromagnetic lock with a mechanical lock. They comprise a fixed pin and a commercial lock with ball lock pins. The balls emerge from the pin when pressing a button and engage on a piece located on the bike.

Also, to recharge bicycle batteries, systems are known using separate connecting elements which are plugged in once the bicycle is anchored. They may also comprise connections adapted to the anchoring elements.

DESCRIPTION OF THE INVENTION

The present invention discloses an electric bicycles anchoring system that allows reliable mechanical anchoring of the bicycle in the station, being easy to maintain and allowing rapid detection of problems.

The anchoring system described detects if a bicycle is really at the station. This helps to know the actual status of the fleet of bicycles. For detection of a bicycle in the docking base, the system has bicycle detection switches which are activated when engaging the bicycle and connectors for battery charging. Both detection switches and connectors are placed in duplicate in the system and are redundant. That is, there are two detection switches located in parallel and four charging connectors (two for positive pole and two for negative pole). The system detects which of these elements are activated. In the event of there being a bicycle anchored in the base, all elements should be activated.

If given, for example, the case that a detection switch (or a connector) fails, the redundant detection switch (or connector) is what gives us the information that the bicycle is at the base and the system also gives us the fault information for repairing it.

The system described also has a high level of security against vandalism. This feature is essential because anchoring stations for electric bicycles are usually installed on the street.

The proposed electric bicycles anchoring system comprises:
 a first module designed to be installed in the base of an anchoring and recharge station for electric bicycles, and
 a second module, which is complementary to the first module, and is intended to be installed on an electric bicycle.

The first module is preferably installed at the higher part of the anchoring station and the second module is preferably arranged in the steering of the bicycle (ie, at the front, underneath the handlebar). This arrangement of the modules in the station and on the bike improves user comfort, as to leave the bike anchored the user does not have to make any strange movement with the bike and does not even need to get off.

When the user has rented (or used) a bicycle and finishes the journey, he or she looks for an anchoring and recharge station to leave the bike there. During the time that the bicycle is at the anchoring station, the battery is recharged. In order for a user to remove the bike, he or she must present an identification signal that identifies the user and activates an electrical circuit that allows the release of the bicycle anchorage. The proposed anchoring system also includes, in the first module, an alarm to prevent an unidentified person from forcing the system and stealing the bicycle.

When the bicycle is placed on the station base, the first module and the second module of the system come together and a projection of the second module is inserted into a hollow mobile body of the first module. Inside the first module there is a ball lock which retains the second module, thus ensuring the anchoring of the bicycle to the station. Additionally the system comprises a locking piece that fits into the mobile body and remains in that position until the station identifies a user. In that moment an electrical signal is sent to an electromagnet to which the locking part is attached. This signal causes the displacement of the electromagnet which in turn moves the locking part with it, releasing the mobile body so that the user can remove the bicycle. Switches detecting the presence of a bicycle at the station are switches that detect the position of said locking part.

Both the first module and the second module comprise electrical charge connections and data transmission elements. The electrical connections allow recharging the battery of the bicycle and are also used as a signal to determine if there is a bicycle at the base. If the electrical charge connections are connected between the first module and the second module it is because the bicycle is at the base of the station. If it is detected that the electrical charge connections of the first module are not connected to anything, it is because there is no bicycle at the anchoring base. As previously described the electrical charge connections are arranged in duplicate to allow detection of any problem that may arise in them.

Electrical charge connections are electrical terminals with a high performance both in the base and in the bicycle. These elements are delicate and sensitive to deterioration by environmental conditions and dirt. Besides being in duplicate they are monitored by the system. Therefore, assuming that there is any fault, the installation continues to operate smoothly and damage is detected for repair.

A difference between this anchoring system and other known in the prior art is that the connectors of the electrical charge connections are arranged asymmetrically, causing the electrical contact between the base and the bicycle to take place earlier in the negative charge terminals. In order to connect two different electrical potentials, it is very important to equate the potentials. To equate potentials, first the negative charge terminals are connected and then the positive charge terminals are connected. Thus possible overvoltage damage is avoided.

Data transmission between the bicycle and the station base is performed by wireless communications, thus avoiding potential problems that could arise if connectors are used due to their deterioration.

The anchoring system comprises an alarm in the first module. This alarm comprises an alarm trigger, an electrical suction cup and an activation switch. The alarm trigger is attached at one end to the mobile body and at the other end it can be attached to the electrical suction cap. The connection between the alarm trigger and the electrical suction cap is performed when the mobile body is displaced (due to having placed the bicycle at the station). The activation switch activates the alarm when it detects that the alarm trigger and the suction cup have been separated abruptly, as this means there has been an attempted robbery.

The anchoring system elements are arranged in high strength metal structures to withstand possible misuse and vandalism. The contact areas between the first module and the second module are preferably made of plastic to minimize wear. Besides these parts comprise guides to allow a more comfortable placement of the bicycle by the user and have some tolerance in the approach movements of the bicycle to the station base.

DESCRIPTION OF THE DRAWINGS

To complement the description being made and in order to aid a better understanding of the characteristics of the invention according to a preferred practical embodiment thereof, attached as an integral part of said description, is a set of drawings wherein, by way of illustration and without limiting the scope of the invention, the following has been represented.

PREFERRED EMBODIMENT OF THE INVENTION

The following describes, with the aid of FIGS. 1 to 5, an embodiment of the present invention.

Figure 1:
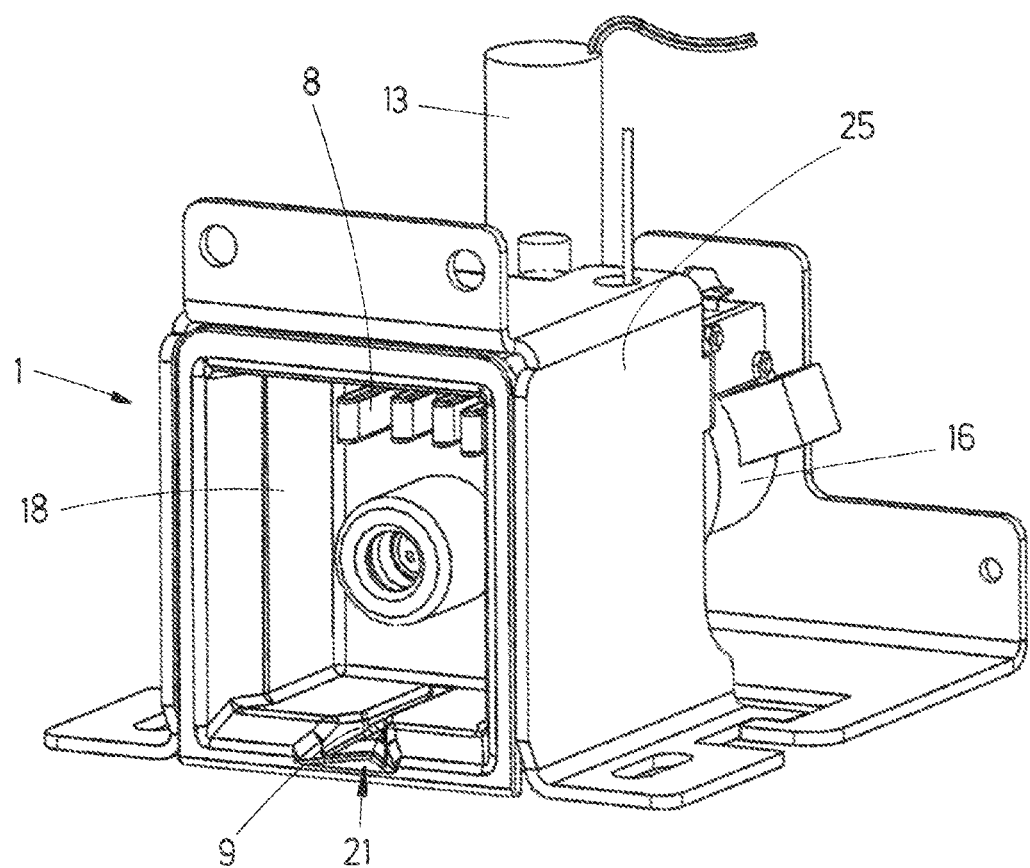
FIG. 1 shows a perspective view of the first module of the anchoring system.
Figure 5:
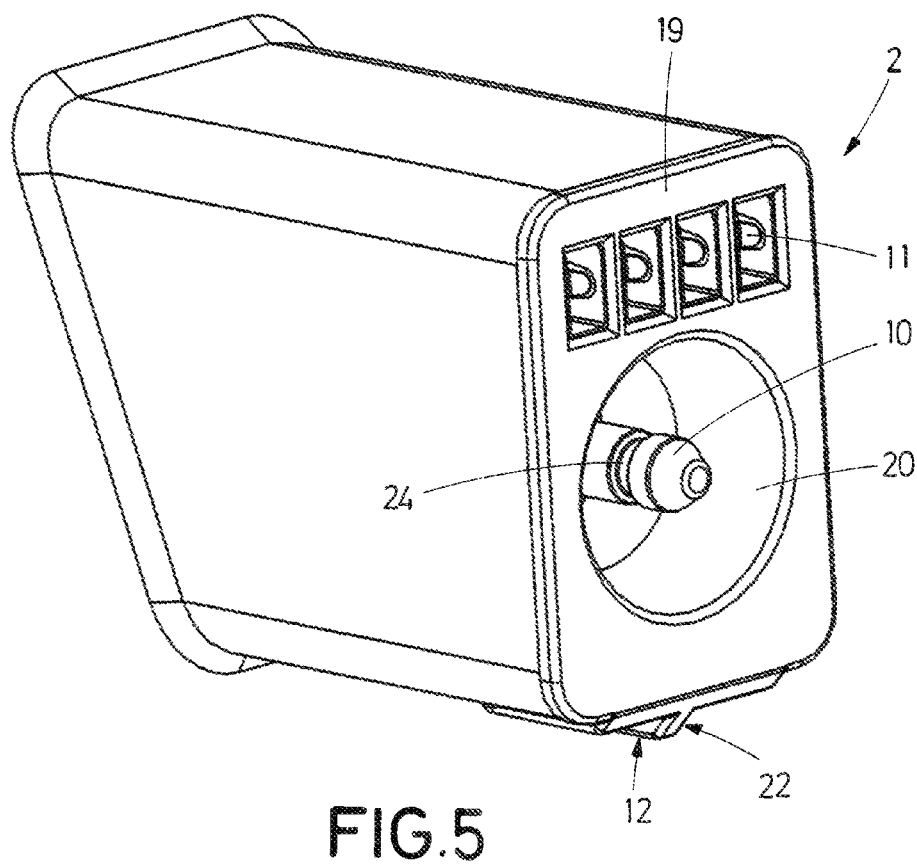
FIG. 5 shows a view of the second module of the anchoring system.

The electric bicycle anchoring system proposed comprises a first module (1), shown in FIG. 1, intended to be installed on the base (3) of an anchoring and recharge station for electrical bicycles and a second module (2), represented in FIG. 5, complementary to the first module (1) and intended to be installed on an electric bicycle.

The first module comprises an outer body (25) with at least one structural element with a hollow interior section (4) inside which a mobile body (5) moves. Said structural member is preferably a cylindrical part whose hollow inner section (4) comprises a section change which marks the narrowing of said section towards the interior of the first module (1). Said mobile body (5) comprises a recess (6) configured to receive a projection (10) of the second module (2). This is how the anchoring of the bicycle at the base station is implemented.

The projection (10) in the first module (1) is retained by a ball lock. In the mobile body (5) the balls (23) of the lock are arranged. These balls (23) fit into a perimeter groove (24) of the projection (10) to ensure the fastening of the bicycle at the station when the projection (10) is inserted into the recess (6). The movement of the mobile body (5) enables or disables the ball lock thanks to the section change in the structural element with a hollow interior section (4). This section change causes the balls to protrude or not from the mobile body (5) (with or without contact between the mobile body (5) and the walls of the hollow section (4)). If the balls (23) protrude from the mobile body (5), they are inserted into the peripheral groove (24) of the projection (10). If the balls (23) do not protrude, the lock is not enabled.

The mobile body (5) comprises a perimeter recess (27) disposed near the end that is inside the first module (1). Said perimeter recess (27) is configured to receive a locking part (14).

Figure 4:
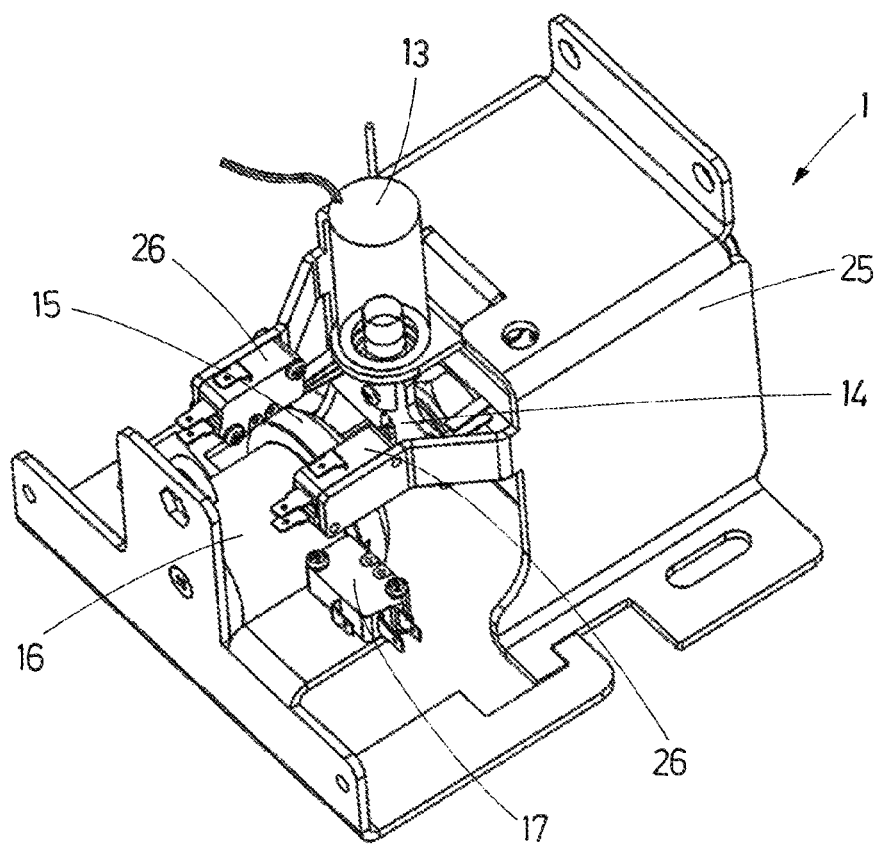
FIG. 4 shows a perspective view of the outer body of the first module with all the elements in it.

The locking part (14) has the possibility of vertical displacement and in the rest position is supported on the mobile body (5). When the projection (10) is inserted into the recess (6) and the mobile body (5) moves, the perimeter recess (27) thereof comes to lie facing the locking part (14), which falls down inserting itself therein. Also, the first module (1) comprises an electromagnet (13) attached to the locking part (14) which permits the release of the bicycle when a user has been identified. The electromagnet (13) has vertical displacement possibility and when receiving an activation current, it moves upward, moving with it the locking part (14), thereby releasing the projection (10). The first module (1) comprises at least one detection switch (26) which detects the position of the locking part (14) to provide information to the system about the presence or not of a bicycle at the base (3). Preferably, as shown in FIG. 4, the first module (1) comprises two detection switches (26), arranged in parallel.

Figure 2:
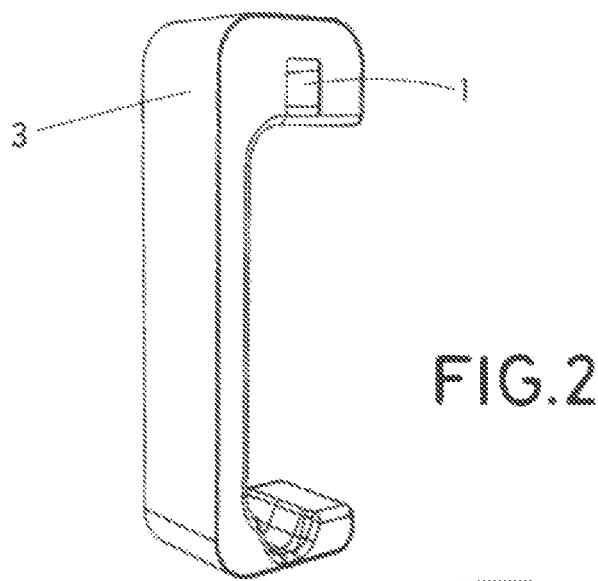
FIG. 2 shows a perspective view of a base in an anchoring and recharge station for electrical bicycles in which the first module of the anchoring system is installed.

In the first module (1) there are also first electrical charge connections (8) and first data transmission elements (9). Preferably said module (1) further comprises a first protective housing (18) in the area designed to remain in contact with the second module (2). This embodiment is shown in FIG. 2 which shows how the first protective housing (18) has a concave configuration in which the second module (2) is housed when the bicycle is anchored at the base.

In the protective housing (18) there are the first connections (8), which are preferably male connections and are arranged in the upper area. It also comprises the first data transmission elements (9), preferably arranged in the lower area. These elements of data transmission (9) may be arranged in a guide (21) of the first protective housing (18)

to help the user to properly insert the second module (2) into the first module (1) and thus ensure the correct placement of the bike at the station.

The second module (2) comprises a support part that allows to attach it to the bicycle and more preferably to the steering of the bicycle. The second module (2) comprises a projection (10) configured for insertion into the mobile body (5), second electrical charge connections (11), configured to make contact with the first connections (8), and second data transmission elements (12) configured to make contact with the first data transmission elements (9).

In one embodiment of the invention the first data transmission elements (9) and the second data transmission elements (12) are wireless communication devices.

In another embodiment as shown in FIG. 5, the second module (2) comprises a second protective housing (19) in the area designed to remain in contact with the first module (1) and which comprises a plurality of recesses (20) in which the second electrical charge connections (11) are found, which are preferably female connections. In the anchoring position of the bicycle the first connections (8) are housed in the second connections (11). The second data transmission elements (12) are arranged in the base of said first protective housing (18) more particularly in a guide (21) of said first protective housing (18) to assist the user in placing the bicycle.

Also the second protective housing (19) comprises a hole in the centre of which the projection (10) is arranged. The hole is designed to receive a cylindrical protrusion of the first module (1) in which the recess (6) is arranged. This second housing (19) also comprises a supplementary guide (22) intended to engage in the guide (21) of the first housing (18).

In a preferred embodiment, the first module (1) comprises a plurality of balls (23) within the recess (6) with possibility of movement in radial direction of the mobile body (5) configured to hold the projection (10) in its position inside the mobile body (5). This embodiment can be seen for example in FIG. 3 which shows a sectioned view of the first module (1).

Also, in the embodiment wherein the first module (1) comprises a plurality of balls (23) in the recess (6), the projection (10) comprises a perimeter groove (24) for receiving said balls (23) of the mobile body (5) when the projection (10) is inserted into the recess (6).

The joining of the locking piece (14) and the mobile body (5) occurs because said mobile body (5) comprises a perimeter recess (27) near one end. The locking part (14) is continuously supported on the mobile body (5) but its fastening is only performed when the projection (10) has been inserted and the mobile body (5) has moved to a position in which the perimeter recess (27) is facing the locking part (14). Then the locking part (14) falls and is inserted into the perimeter recess (27). To remove the bike, when an authorized user is detected an electrical signal is sent to the electromagnet (13) which raises the locking part (14) to release the mobile part (5). Thus the user can remove the bicycle from the station base.

In the first module (1) there is also an alarm trigger (15), which is a ferromagnetic part arranged at one end of the mobile body (5), and an electromagnetic suction cap (16), facing the alarm trigger (15). When the alarm trigger (15) is attached to the suction cup, an activation switch (17) detects this contact and prevents the alarm from sounding. When someone pulls the bicycle without being authorized to remove it, the alarm trigger (15) is separated abruptly from the suction cup (16) and activation switch (17) triggers the alarm.

When someone tries to force the system to steal a bicycle, the alarm is activated but the ball lock remains active. The locking part (14) is held in its position in which is abutted with the mobile body (5) and thus said mobile body (5) does not move and the balls (23) remain held in the perimeter groove (24).

Figure 3:
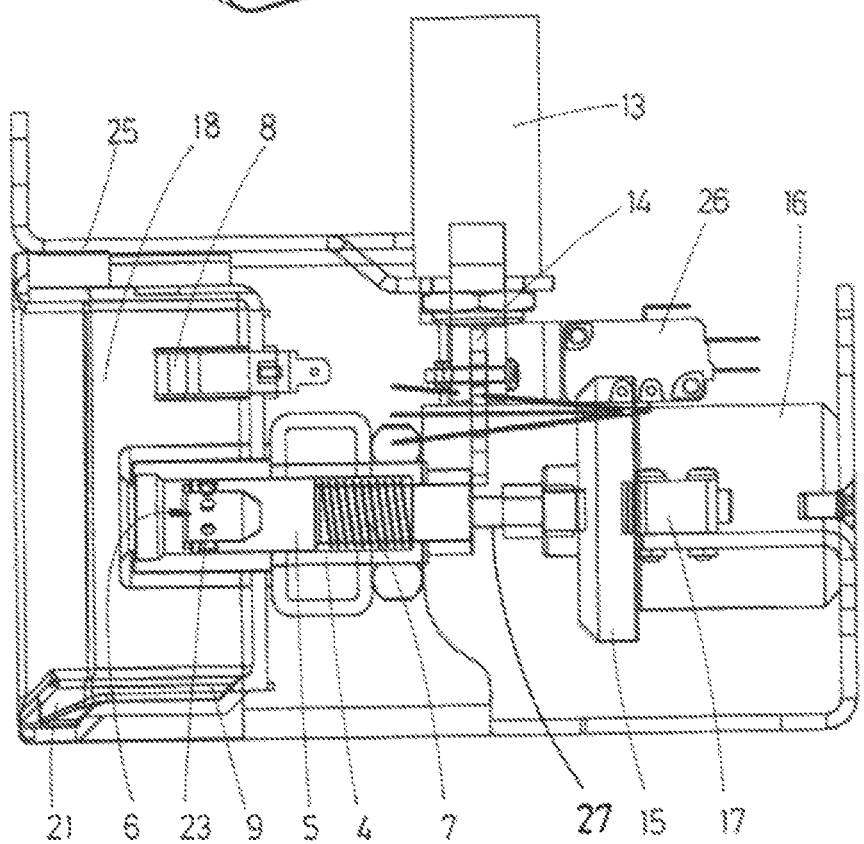
FIG. 3 shows a sectional view of the first module of the anchoring system

When the mobile part (5) moves because of the insertion of the projection (10) into the first base (1), the electromagnetic suction cap (16) is actuated by the movement of the alarm trigger (15). As shown in FIG. 3, said alarm trigger can be a cylindrical part attached to one end of the mobile body (5). If there is a strong pull on the bicycle without presenting an identification to activate the electrical system, the alarm trigger (15) is abruptly separated from the suction cup (16) and the activation switch (17) will detect this change and will activate the alarm. The bicycle will continue attached to the station base because the ball lock continues to function.

To release a bicycle, a user needs to present a valid identification so that an electric current can actuate the electromagnet (13) lifting it and lifting with it the locking part (14), thereby releasing the mobile body (5). At the same time another electric current is applied to the suction cup (16) to disable it. Thus the mobile body (5) returns to the original position, moving the balls (23) therein and releasing the projection (10) of the second module (2).

Also, as shown in FIG. 3, the first module (1) further comprises a spring (7) linked to the mobile body (5) to dampen its movement. Said spring (7) is disposed around the mobile body (5).

The invention claimed is:

1. An anchoring system comprising a first module to be installed on a base of an anchoring and recharge station for electric bicycles and a second module, complementary to the first module to be installed on an electric bicycle, wherein:
   the first module comprises:
      an outer body with at least one structural element with a hollow,
      a mobile body with at least one recess, wherein said mobile body comprises at least one perimeter recess,
      an electromagnet attached to a locking part transversally displaceable with respect to the mobile body, wherein the locking part fits into the perimeter recess of the mobile body to maintain a position,
      a ball lock comprising a plurality of balls arranged radially on at least one wall of the mobile body,
      first electrical charge connections,
      first data transmission elements,
      an alarm that comprises:
         an alarm trigger comprising a ferromagnetic part arranged at one end of the mobile body,
         an electromagnetic suction cup linked to the alarm trigger, and
         an activation switch which detects attachment between the alarm trigger and the electromagnetic suction cup; and activates an alarm signal when the alarm trigger and the electromagnetic suction cup are separated and the first electrical connections and the second electrical connections are in contact,
   the second module comprises:
      a projection configured for insertion into the recess of the mobile body has a perimeter groove for receiving the plurality of balls of the ball lock, second electrical charge connections configured to make contact with the first electrical charge connections, second data transmission elements configured to make contact with the first data transmission elements.

2. The anchoring system of claim 1 wherein the first electrical charge connections arranged in the first module are male connections and the second electrical charge connections arranged in the second module are female connections whereby in the anchoring position of the bicycle the first connections are housed in the second connections.

3. The anchoring system of claim 1 wherein the first data transmission elements and the second data transmission elements are wireless communication devices.

4. The anchoring system of claim 1 wherein the first module further comprises a spring linked to the mobile body and arranged around said mobile body.

5. The anchoring system of claim 1 wherein the first module comprises a first protective housing in the area designed to remain in contact with the second module having a concave configuration and houses the second module when the bicycle is anchored at the base.

6. The anchoring system of claim 1 wherein the second module comprises a second protective housing disposed in the area designed to remain in contact with the first module and comprising a plurality of recesses in which the second electrical charge connections are placed and the second data transmission elements are arranged in the base of said second protective housing.

7. The anchoring system of claim 6 wherein the second protective housing comprises an orifice with a center supporting the projection and which is designed to receive a cylindrical protrusion of the first module wherein the recess is arranged.

8. The anchoring system of claim 1 wherein it comprises at least one detection switch which detects the position of the locking part.

* * * * *